US012717761B2

(12) United States Patent
Ryan et al.

(10) Patent No.: US 12,717,761 B2
(45) Date of Patent: Aug. 25, 2026

(54) ENHANCED AVAILABILITY MANAGEMENT OF VIRTUAL STORAGE VOLUMES IN FILE SYSTEM SERVICES

(71) Applicant: NetApp, Inc., San Jose, CA (US)

(72) Inventors: Michael Scott Ryan, Wake Forest, NC (US); Sangramsinh Pandurand Pawar, Bedford, MA (US); Joseph Allen Brown, Jr., Raleigh, NC (US); William Derby Dallas, Merrimack, NH (US)

(73) Assignee: NetApp, Inc., San Jose, CA (US)

( * ) Notice: Subject to any disclaimer, the term of this patent is extended or adjusted under 35 U.S.C. 154(b) by 78 days.

(21) Appl. No.: 19/036,869

(22) Filed: Jan. 24, 2025

(65) Prior Publication Data

US 2026/0220095 A1 Jul. 30, 2026

(51) Int. Cl.
*G06F 16/188* (2019.01)

(52) U.S. Cl.
CPC .................................. *G06F 16/188* (2019.01)

(58) Field of Classification Search
CPC ..................................................... G06F 16/188
USPC ........................................................... 710/48
See application file for complete search history.

(56) References Cited

U.S. PATENT DOCUMENTS 10,606,625 B1 * 3/2020 Belianski .............. G06F 3/0607
10,693,955 B2 * 6/2020 Lalsangi ............. H04L 41/0846
2010/0088485 A1 * 4/2010 Ikeda ....................... G06F 3/067 711/170
2010/0251012 A1 * 9/2010 Zwisler ............... G06F 11/1092 714/E11.085
2011/0191538 A1 * 8/2011 Maeda ................ G06F 11/1469 711/114
2012/0084600 A1 * 4/2012 Kidney ............... G06F 11/1088 714/6.13
2013/0290541 A1 * 10/2013 Hatasaki ................ G06F 3/067 709/226
2013/0346794 A1 * 12/2013 Bartlett ............... G06F 11/2069 714/6.21
2017/0185318 A1 * 6/2017 Jia ......................... G06F 3/0611
2017/0300248 A1 * 10/2017 Purohit ................. G06F 3/0623
2017/0300388 A1 * 10/2017 Zheng ................. G06F 11/1464
2017/0371567 A1 * 12/2017 Piduri ..................... G06F 3/065
2020/0104523 A1 * 4/2020 Theimer ............... G06F 16/172
2020/0167093 A1 * 5/2020 Lan ....................... G06F 3/0664
2021/0334179 A1 * 10/2021 Sarfare ............... G06F 11/1435
(Continued)

*Primary Examiner* — Christopher B Shin

(57) ABSTRACT

The disclosure describes systems, devices, and methods for automating the reintegration of a failed virtual storage block into a file system service upon recovery of the virtual storage block. In an example embodiment, a method performed by a storage controller in a file system service is provided. In performing the method, the storage controller determines that a virtual storage volume of an array of virtual storage volumes has become unavailable, and in response to determining that the virtual storage volume has become unavailable, pauses use of the virtual storage volume and monitors for the virtual storage volume to return to an available state. Upon the virtual storage volume returning to the available state, the storage controller tests multiple portions of the virtual storage volume. After successfully testing the multiple portions of the virtual storage volume, the storage controller commences with the use of the virtual storage volume.

20 Claims, 10 Drawing Sheets

(56) References Cited

U.S. PATENT DOCUMENTS

| | | | | |
|---|---|---|---|---|
| 2023/0273742 | A1* | 8/2023 | Nazari | G06F 3/067 |
| 2024/0054056 | A1* | 2/2024 | Sarfare | G06F 11/1464 |
| 2024/0370410 | A1* | 11/2024 | Dronamraju | G06F 11/1662 |
| 2024/0394150 | A1* | 11/2024 | Fisher | G06F 11/1435 |

* cited by examiner

ENHANCED AVAILABILITY MANAGEMENT OF VIRTUAL STORAGE VOLUMES IN FILE SYSTEM SERVICES

TECHNICAL FIELD

Embodiments of the present disclosure relate generally to data storage technology and in particular to virtual storage volume availability management.

BACKGROUND

A file system service is a cloud-based service that provides customers with a choice of file systems for storing and interacting with their data on block-based storage. The block-based storage is provided by a block storage service that provides persistent, high-performance, virtual storage volumes that act like hard drives, allowing data to be stored in fixed-size blocks.

The file systems are provided by storage controllers. The storage controllers interface between applications and the virtual storage volumes provided by the block storage service, handling data input and output (I/O) such as read and write requests. At a high level, the controllers include a file system layer and a redundancy layer. The file system layer of a controller interfaces with the applications, while the redundancy layer interfaces with the storage volumes provided by the block storage service.

At times, a virtual storage volume in an array of volumes may become unavailable. This may occur due to, for example, networking or power issues experienced by the block storage service. Internal to the controller, the storage volume is marked as having failed, meaning that I/O cannot continue with respect to the failed storage volume. However, the storage volume may eventually become available again once the block storage service resolves the related problems. At that time, manual intervention at the controller via an administrative process is needed to "un-fail" the storage volume. Unfortunately, such manual intervention may be slow and potentially error prone.

SUMMARY

The technology described herein improves the management of virtual storage volumes that become unavailable. In an example embodiment, a method performed by a storage controller in a file system service is provided. In performing the method, the storage controller determines that a virtual storage volume of an array of virtual storage volumes has become unavailable, and in response to determining that the virtual storage volume has become unavailable, the storage controller pauses use of the virtual storage volume and monitors for the virtual storage volume to return to an available state. Upon the virtual storage volume returning to the available state, the storage controller tests multiple portions of the virtual storage volume. After successfully testing the multiple portions of the virtual storage volume, the storage controller commences with the use of the virtual storage volume.

This Summary is provided to introduce a selection of concepts in a simplified form that are further described below in the Detailed Description. It may be understood that this Summary is not intended to identify key features or essential features of the claimed subject matter, nor is it intended to be used to limit the scope of the claimed subject matter. These and other features and aspects of various examples may be understood in view of the following detailed discussion and accompanying drawings.

BRIEF DESCRIPTION OF THE DRAWINGS

For a more complete understanding of the present invention(s), and the advantages thereof, reference is now made to the following descriptions taken in conjunction with the accompanying drawings.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION

Figure 1:
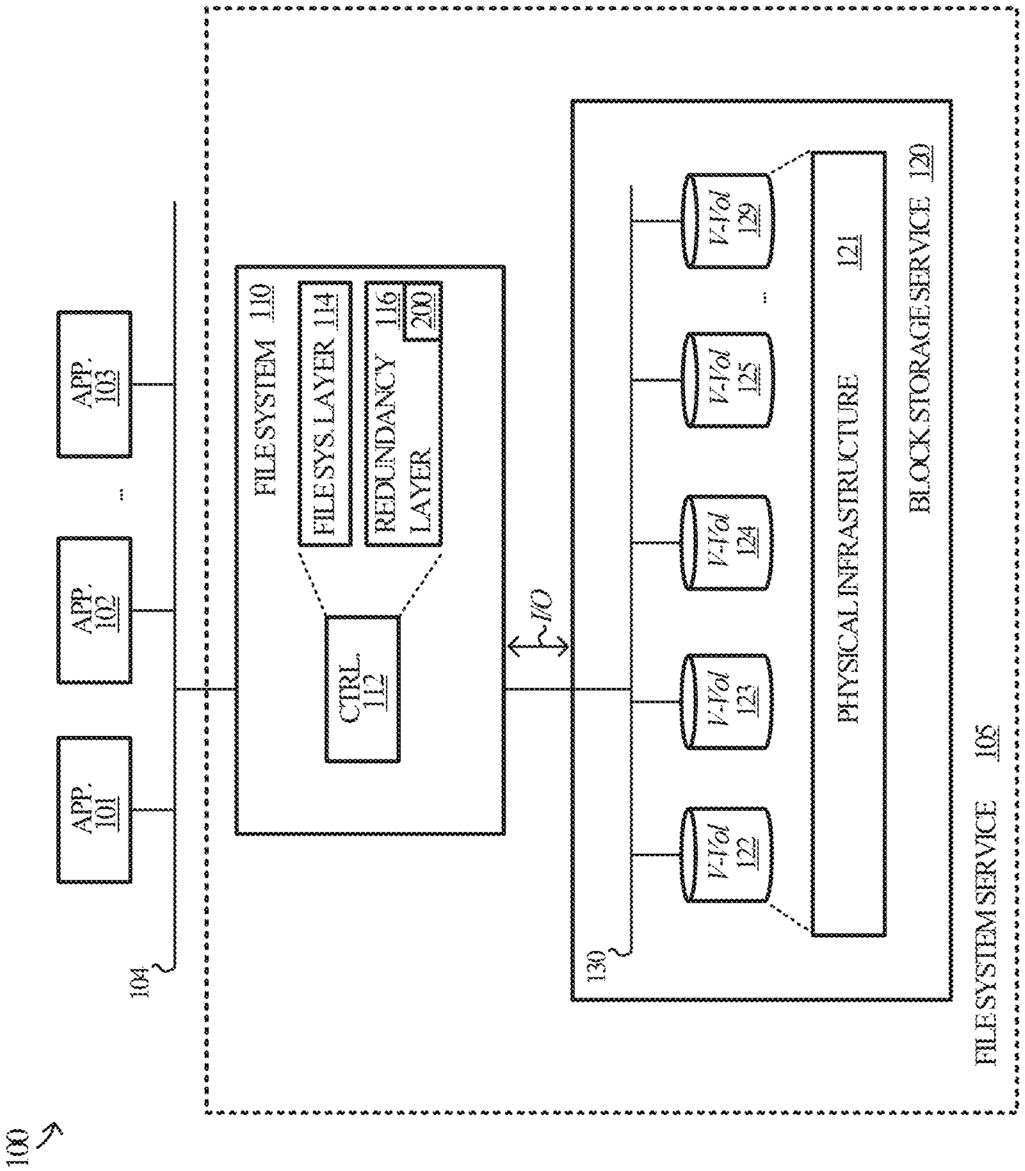
FIG. 1 illustrates an example operating environment in an implementation.

Various embodiments of the present technology relate to file system services. A file system service provides organizations and users with a solution for storing, managing, and maintaining data. More particularly, the file system service offers organizations and users a choice of file systems for storing and interacting with their data stored via block-based storage, which may be managed and maintained by the organizations and users, or by a file system service provider.

The block-based storage is provided by a block storage service that provides persistent, high-performance storage volumes that act like hard drives, allowing data to be stored in fixed-size blocks. The block storage service creates and manages virtualized, block-based storage by abstracting underlying physical storage infrastructure, such as hard-disk drives and solid-state drives, into virtual storage volumes (e.g., elastic block store volumes). For example, each virtualized storage volume corresponds to one or more physical storage devices (e.g., solid-state drives, hard-disk drives) on a shelf or rack in a physical location pooled together as a single virtualized storage resource. The physical storage devices are powered by and connected to a communication network by various hardware components (e.g., power supplies, interconnects).

Users interact with the data stored on the virtual storage volumes through a file system, which serves as an intermediary layer between the users/applications and the virtual storage volumes instantiated by the block storage service. For example, the file management service utilizes a storage operating system (e.g., NetApp ONTAP® (without derogation of trademark rights of NetApp Inc., the assignee of this application)) to manage input/output (I/O), allowing users to access data stored on the virtual storage volumes.

The storage controllers include several layers to perform file storage and file management functions, such as a file system layer and a redundancy layer. For example, the file system layer of a controller interfaces with the applications to receive I/O requests and provide data to users of the applications upon completion of I/O requests. The redundancy layer interfaces with the storage volumes provided by the block storage service to store and access data stored thereon. The redundancy layer maintains metadata that includes a list of available storage volumes among an array of virtual storage volumes, data stored on each of the storage volumes, and the like.

Despite storage flexibility and scalability benefits, block storage services suffer from both virtualization issues (e.g., latency, resource contention, data integrity) and hardware-based issues (e.g., electrical failures, logical failures, network connectivity), which can impact storage accessibility. In some embodiments, when a virtual storage volume becomes unavailable even temporarily, I/O via the file system may go unanswered without acknowledgement to the users/applications, and the redundancy layer of the file system may designate the storage volume as failed. In some embodiments, the file system and/or the block storage service may replicate data to prevent I/O failure. In such embodiments, the file system may obtain the data for a corresponding I/O request from a different virtual storage volume until the failed virtual storage volume is recovered. Eventually, the storage volume may become available again once the block storage service resolves the related problems. At that time, manual intervention at the controller via an administrative process is needed to "un-fail" the storage volume. Unfortunately, such manual intervention may be slow and potentially error prone. Such issues are magnified when the file management service includes multiple storage controllers responsible for I/O traffic to a plurality of virtual storage volumes, as failure of any one of the virtual storage volumes may impact all of the storage controllers in shared-everything architectures where each storage controller can read from and write to any of the virtual storage volumes.

Technology is disclosed herein that mitigates the problems discussed above with respect to failure and recovery of virtual storage provided by a block storage service of a file system service. To solve the above problems, systems, devices, and methods are disclosed herein to test and reintegrate failed (from the file system perspective) virtual storage volumes into available storage accessible by the file system to alleviate issues caused by I/O failure. For example, the present disclosure describes identifying a failure of a virtual storage volume, detecting a recovery of the failed virtual storage volume, performing testing of the recovered virtual storage volume (e.g., with respect to I/O capabilities, e.g., ability to service I/O), and reintegrating the recovered virtual storage block to available storage of a file system service after successful testing.

Monitoring for recovered virtual storage volumes is beneficial for automating recovery and reintegration processes as the block storage service might not provide any indication of the recovery to the file system. Additionally, the testing is also helpful to prevent further I/O loss or data loss when encountering bad physical storage devices or connections thereto. More specifically, if a portion of the virtual storage volume, corresponding to a failed physical storage device, is not tested, future I/O associated with the failed physical storage device may fail again. Once portions of the virtual storage volume return responses (indicative of success with respect to testing), the file system re-introduces the virtual storage block to an array of available virtual storage blocks presented by the block storage service.

Advantageously, the solution ensures that a whole virtual storage volume has recovered and is available to service I/O, then automatically reintegrates the virtual storage volume to process previously failed and future I/O operations. While generally applicable to numerous endeavors, including both physical and virtual storage, the disclosed systems, devices, and methods are particularly useful in data storage environments involving managed file systems and services that interface with block storage systems and services. FIGS. 1, 2, 3, 4, 5A, 5B, 6, 7A, 7B, and 8 below illustrate and describe additional details of such systems, devices, and methods.

FIG. 1 illustrates operating environment 100 in which elements of a file system service operate in an implementation. Operating environment 100 includes applications 101, 102, and 103, and file system service 105. File system service 105 includes file system 110 and block storage service 120. File system 110 includes controller (may also be referred to as a storage controller, storage system controller) 112 having a file system layer 114 and a redundancy layer 116 (may also be referred to as "RAID" layer, wherein RAID stands for redundant array of inexpensive disks). Block storage service 120 includes various virtual volumes instantiated by physical infrastructure 121. In various embodiments, controller 112 is configured to perform volume recovery and reintegration processes, such as method 200 of FIG. 2.

Operating environment 100 is representative of a data storage environment that includes hardware, software, and firmware components capable of storing data, managing access to the data, and managing storage devices, among other functions. More particularly, in operating environment 100, file system 110 is representative of a file management system capable of interfacing between applications 101, 102, and 103 and block storage service 120 to provide data storage and management functionality. Block storage service 120 is representative of a block-based storage service (e.g., an elastic block store (EBS)) capable of providing such storage. For example, block storage service 120 hosts virtual storage volumes (e.g., virtual volumes 122, 123, 124, 125, and 129) instantiated by physical infrastructure 121.

Virtual volumes 122, 123, 124, 125, and 129 are representative of virtual or cloud-based storage blocks accessible by file system 110. The storage capabilities of the virtual volumes are based on physical storage devices of physical infrastructure 121. For example, physical infrastructure 121 may include numerous storage devices (e.g., SSDs, HDDs) capable of storing data, power supplies capable of driving the storage devices, interconnects and various network connectivity hardware (e.g., routers, switches, relays, interfaces, etc.) capable of connecting the storage devices and the virtual instantiations to one or more communication networks (e.g., network 130), and the like. Accordingly, each of the virtual volumes of block storage service 120 may be connected to network 130 through which I/O requests can be provided to the virtual volumes from file system 110, and through which data can be transferred to file system 110 and to other virtual volumes.

Applications 101, 102, and 103 are representative of applications running on one or more computing devices, systems, servers, or the like. Users of applications 101, 102, and 103 request data storage and/or access to stored data through file system 110 over network 104. Each of applications 101, 102, and 103 may include and may be implemented in hardware, software, and/or firmware, as well as combinations and variations thereof. By way of example, application 101 is representative of a server running an application that interfaces with controller 112 via network 104 to read from and write to storage provided by and accessible by controller 112.

Controller 112 is representative of a device, system, server, or service of file system 110 capable of accessing and managing storage. In doing so, controller 112 may interface with one or more of the applications in accordance with a storage network and access protocol, such as Non-Volatile Memory Express (NVMe). Controller 112 may also interface with block storage service 120 in accordance with such storage network and access protocols. Other protocols such as Network File System (NFS), Server Message Block protocol (SMB), Internet Small Computer System Interface (iSCSI), Fiber Channel (FC), Fiber Channel over Ethernet (FCoE), and the like may be contemplated.

By way of example, controller 112 may be a server configured to run an instance of a storage operating system (e.g., NetApp ONTAP® (without derogation of trademark rights of NetApp Inc., the assignee of this application)) to perform I/O operations based on I/O requests received from an application.

Figure 2:
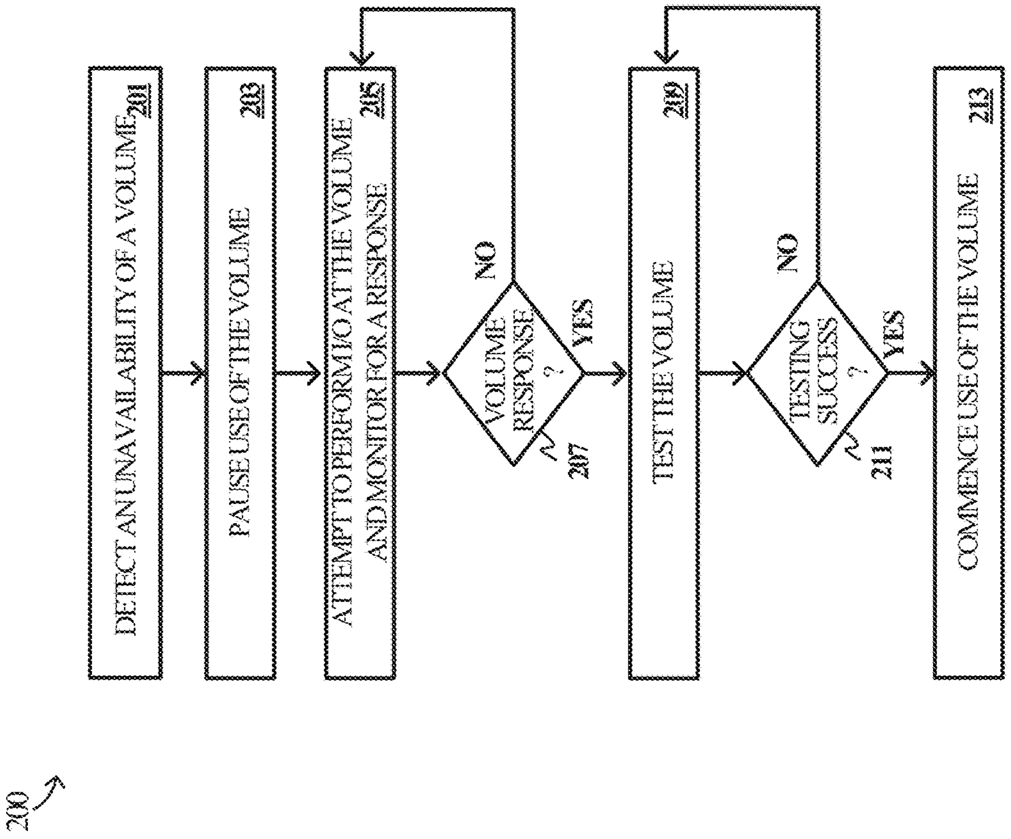
FIG. 2 illustrates a method for unfailing a virtual storage volume of a block storage service in an implementation.

As shown in operating environment 100, controller 112 includes a file system layer 114 and a redundancy layer 116 collectively capable of performing data storage, data storage management, and data recovery processes, such as those of method 200 of FIG. 2, among other functions. In some embodiments, controller 112 includes additional layers, such as a management layer, an interface layer, and the like.

File system layer 114 is representative of a software layer of controller 112 capable of interfacing with application 101 to receive I/O requests and provide data, and with redundancy layer 116 to provide the I/O requests and receive the data. Redundancy layer 116 is representative of another software layer of controller 112 that further interfaces with block storage service 120 to perform I/O. The particular virtual volumes of block storage service 120 at which redundancy layer 116 performs the I/O operations are based on the I/O requests and metadata maintained by redundancy layer 116. The metadata may include logical representations of the virtual volumes, logical addresses corresponding to available storage of the virtual volumes, a layout of the virtual volumes and associated data stored thereon. Additionally, redundancy layer 116 may compute parity data corresponding to stored data for data redundancy and recovery purposes, such as when a subset of the virtual volumes are used in a redundant storage arrangement (e.g., Redundant Array of Inexpensive Disks (RAID)).

FIG. 2 illustrates method 200 for performing virtual volume status detection, recovery, and reintegration operations in an implementation. Method 200 may be employed by a computing device, such as controller 112 (e.g., redundancy layer 116 thereof) of operating environment 100, an example of which is provided by computing system 501 of FIG. 5A. Accordingly, method 200 may be implemented in hardware, software, and/or firmware, and may be implemented in program instructions executable by one or more processors of the computing device. The program instructions direct the computing device to operate in accordance with the steps of method 200, which reference elements of FIG. 1.

To begin, in operation 201, controller 112 receives an I/O request from application 101 (e.g., over network 104) corresponding to a read request of data stored at virtual volume 122 and performs an I/O operation at virtual volume 122 to read the data, but fails to receive the data from virtual volume 122. More particularly, controller 112, or redundancy layer 116 thereof, fails to receive the data or an acknowledgement from virtual volume 122 within a predetermined amount of time, and thus, determines that virtual volume 122 is unavailable or unresponsive.

In operation 203, upon detecting the unavailability of virtual volume 122 based on virtual volume 122 timing out, controller 112 pauses use of virtual volume 122. To fulfill the I/O request from application 101, controller 112 may perform another I/O operation at a different virtual volume holding a replicated version of the data. Alternatively, controller 112 may determine the data being requested using RAID techniques (e.g., parity data). Controller 112 may also update metadata associated with virtual volume 122 to indicate the unresponsive state of virtual volume 122.

In operation 205, following the failure of virtual volume 122, controller 112 initiates a volume recovery operation. In various embodiments, this may entail controller 112 attempting to perform I/O operations (e.g., read requests) at virtual volume 122 and monitoring for responses to the I/O commands. For example, controller 112 sends I/O commands to block storage service 120 every X amount of seconds, minutes, or hours (e.g., every five second), where X is a predetermined amount of time. For each I/O command, controller 112 monitors for a response from the virtual volume 122.

In operation 207, if controller 112 fails to receive any responses to the I/O operations from virtual volume 122, controller 112 determines that the volume recovery operation has failed and repeats operation 205 until virtual volume 122 responds to the I/O operations. Controller 112 may repeat operation 205 to continue to check for responses to further I/O operations performed at virtual volume 122. Upon detecting a response to an I/O operation, controller 112 proceeds to operation 209.

In operation 209, controller 112 tests virtual volume 122 prior to transitioning virtual volume 122 to a responsive state. In testing virtual volume 122, controller 112 first identifies several segments (e.g., 16 segments) of virtual volume 122 based on metadata associated with virtual volume 122. More specifically, controller 112 identifies various portions of virtual volume 122, determines start and end addresses associated with the portion, and determines midpoints of the portions. Next, controller 112 performs I/O operations (e.g., read requests) to virtual volume 122 corresponding to the midpoints of each portion of virtual volume 122 in an attempt to determine whether each portion of virtual volume 122 is responsive or unresponsive with respect to a corresponding I/O command.

In various examples, virtual volume 122 includes virtual storage blocks instantiated by numerous physical storage devices, among other elements of physical infrastructure 121. In such examples, each portion of virtual volume 122 may correspond to a different one of the physical storage devices. Thus, if an issue (e.g., network connectivity, power loss) persists with at least one of the physical storage devices, virtual volume 122 might not return a response to an I/O command corresponding to a portion associated with the failed physical storage device.

In operation 211, controller 112 monitors for responses to the I/O operations from the portions of virtual volume 122 and determines whether the test is successful or unsuccessful based on the number of responses received from virtual volume 122. In particular, a successful test includes one where controller 112 receives responses from all of the portions of virtual volume 122. An unsuccessful test includes one where a portion fails to output a response to controller 112. If a portion fails to respond to an I/O command, controller 112 determines that the volume recovery operation has failed as in operation 211. Controller 112 may then repeat operation 209 to perform another test of virtual volume 122 to check for responses to further I/O operations performed at virtual volume 122. After a successful test, controller 112 proceeds to operation 213.

In operation 213, controller 112 recovers virtual volume 122 and commences use of virtual volume 122 based on all portions of virtual volume 122 being responsive to I/O commands. This may entail re-introducing the virtual volume into the file system service, such as by updating the metadata to indicate that virtual volume 122 has returned to a responsive state. Then, controller 112, among other controllers, may proceed to perform any failed, pending, or future I/O operations associated with virtual volume 122.

Figure 3:
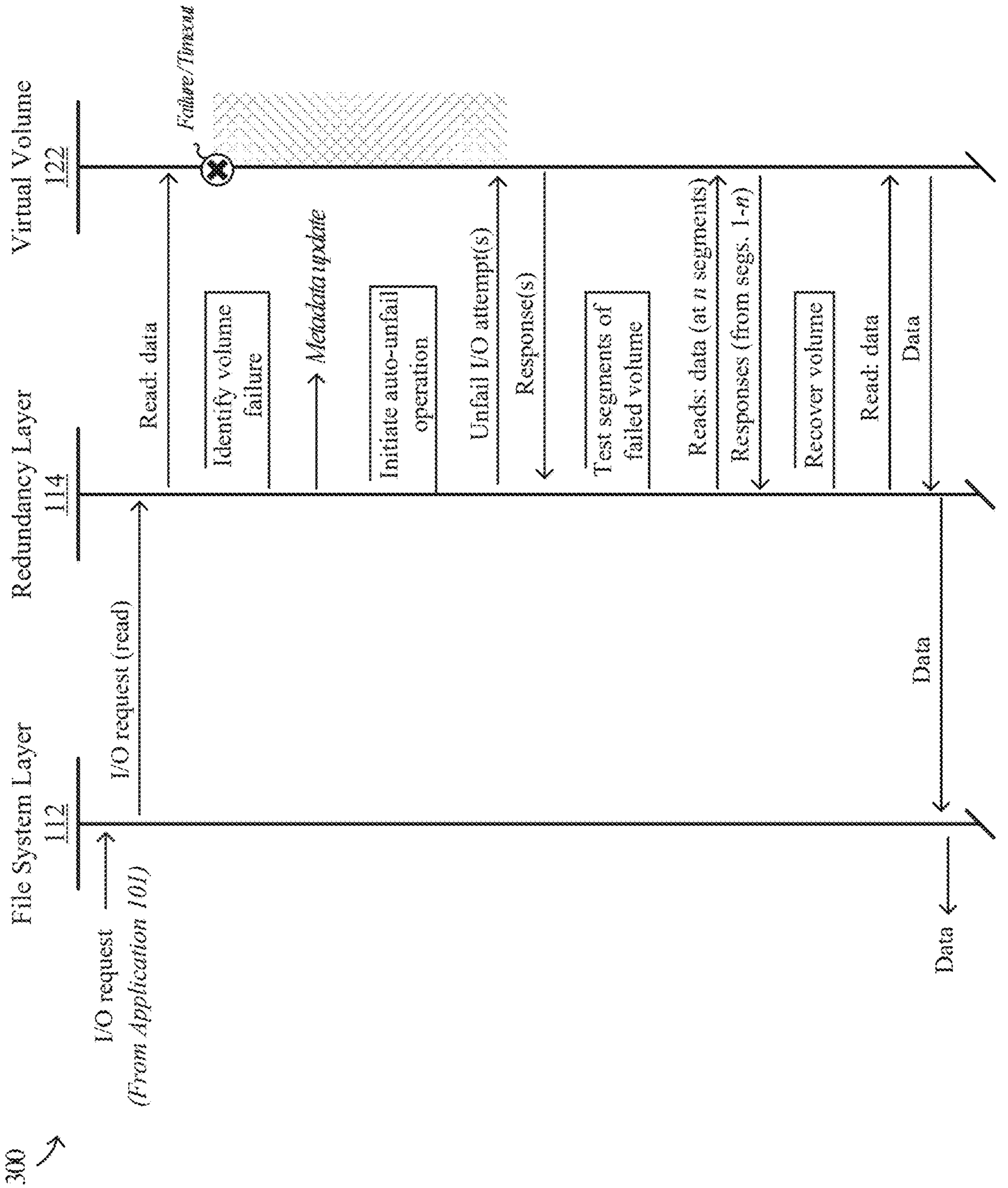
FIG. 3 illustrates an example operational sequence of unfailing a virtual storage volume of a block storage service in an implementation.

FIG. 3 illustrates operational sequence 300 demonstrative of an example sequence of steps performed by elements of a file system service, which includes and references elements of operating environment 100. In particular, operational sequence 300 includes steps performed by controller 112 with respect to virtual volume 114 of block storage service 120.

To begin operational sequence 300, file system layer 114 of controller 112 receives an I/O request from application 101 over network 104. File system layer 114 provides the I/O request to redundancy layer 116 of controller 112, then redundancy layer 116 performs an I/O operation based on the I/O request at virtual volume 122 of block storage service 120. By way of example, the I/O request includes a request to read data from virtual volume 122. As such, redundancy layer 116 reads data specified in the request at virtual volume 122.

After attempting to read data from virtual volume 122 when performing the I/O request, redundancy layer 116 determines that virtual volume 122 has failed based on the I/O operation timing out. More specifically, redundancy layer 116 determines that virtual volume 122 fails to respond to the I/O operation, and therefore, redundancy layer 116 does not receive data in response to the I/O operation. Upon determining that virtual volume 122 has failed, redundancy layer 116 updates metadata associated with virtual volume 122 to indicate that virtual volume 122 has transitioned to an unresponsive state.

Next, redundancy layer 116 initiates a volume recovery operation to attempt to reach virtual volume 122 and obtain a response from virtual volume 122. More specifically, this may entail pausing use of virtual volume 122, then attempting to un-fail virtual volume 122 by performing (every X amount of seconds, minutes, or hours (e.g., every five second) read operations at virtual volume 122 and monitoring for responses to the read operations.

Meanwhile, block storage service 120 resolves the issue(s) causing virtual volume 122 to timeout and be unresponsive to I/O commands, and as a result, virtual volume 122 provides a response to an I/O operation to redundancy layer 116.

Once redundancy layer 116 receives a response to one of the read operations, redundancy layer 116 initiates a testing operation of virtual volume 122 to test virtual volume 122 with respect to I/O capabilities (e.g., the ability to provide data in response to a read operation, the ability to write data in response to a write operation) prior to transitioning virtual volume 122 to a responsive state and performing any failed or pending I/O operations associated with virtual volume 122. In testing virtual volume 122, redundancy layer 116 first identifies several segments (e.g., 16 segments) of virtual volume 122 based on metadata associated with virtual volume 122. More specifically, redundancy layer 116 identifies various portions of virtual volume 122, determines start and end addresses associated with the portion, and determines midpoints of the portions. Next, redundancy layer 116 performs a test read operation at a midpoint of each portion of virtual volume 122 in an attempt to determine whether a portion of virtual volume 122 is responsive or unresponsive with respect to the I/O operation.

Redundancy layer 116 monitors for responses to the read operations from the portions of virtual volume 122 and determines whether the test is successful or unsuccessful based on the number of responses received from virtual volume 122. In particular, a successful test includes one where controller 112 receives responses from the portions of virtual volume 122. An unsuccessful test includes one where one or more portions fails to output a response to controller 112. If a portion fails to respond to an I/O command, redundancy layer 116 determines that the testing operation has failed. If redundancy layer 116 receives responses from all the segments, redundancy layer 116 recovers virtual volume 122. This may entail re-introducing the virtual volume into the data storage environment, such as by updating the metadata to indicate that virtual volume 122 has returned to a responsive state, and commencing use of the virtual volume.

Upon commencing re-use of the virtual volume, redundancy layer 116 performs the failed I/O operation from the beginning of operational sequence 300, among other I/O operations, to read data from virtual volume 122. Redundancy layer 116 receives the data based on the I/O operation, provides the data to file system layer 114, and file system layer 114 provides the data downstream to application 101. Alternatively, redundancy layer 116 may perform the failed I/O operation before recovering the failed virtual volume, such as by performing an I/O operation at a different virtual volume that stores a replicated version of the data being requested to reduce latency in providing the data to application 101.

Figure 4:
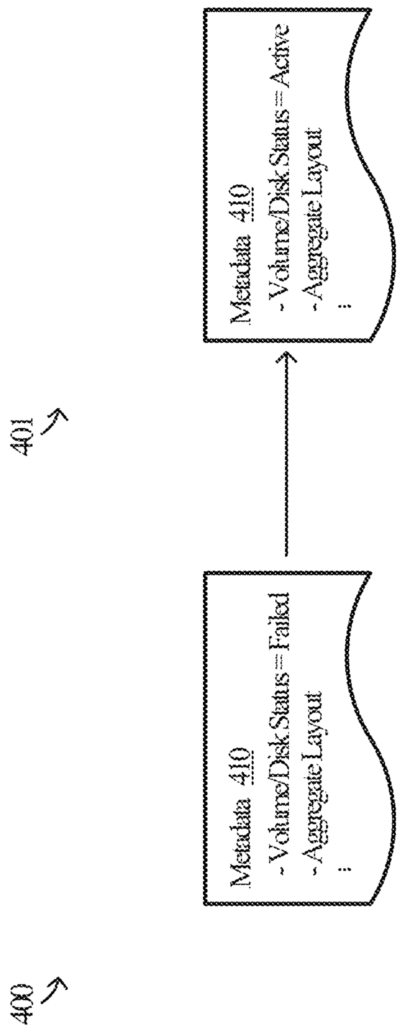
FIG. 4 illustrates an example aspect of metadata associated with a virtual storage volume of a block storage service in an implementation.

FIG. 4 illustrates an example aspect of metadata utilized by a file system service in an implementation. FIG. 4 shows aspect 401 that includes metadata 410 at a first time after failure of a virtual volume of a block storage service, and aspect 402 that includes metadata 410 at a second time after recovery and reintegration of the virtual volume.

In various examples, metadata 410 is representative of data associated with a storage aggregate provided by a block storage service, such as virtual volumes 122, 123, 124, 125, and 129 of block storage service 120. For example, metadata 410 may indicate a status of each virtual volume in the storage aggregate (e.g., failed or active, responsive or unresponsive), I/O operations associated with each virtual volume, available addresses and capacity of each virtual volume, a layout of the virtual volumes relative to one another, data stored on the virtual volumes, and the like.

A controller of a file system, such as controller 112 of file system 110, can store metadata 410 at a location within one or more of the virtual volumes. Alternatively, or additionally, the controller may store metadata 410 at a location external relative to the virtual volumes accessibly by any controller in the data storage environment. The controller can then read metadata 410 from a location and write metadata 410 to the location when performing I/O operations.

By way of example, aspect 401 shows metadata 410 stored by controller 112 at a first time. Metadata 410 includes indications of status of a virtual volume of block storage service 120, such as virtual volume 122, as well as a layout of the virtual volumes of block storage service 120, among other information. During operation, controller 112 performs I/O operations to access the virtual volumes. When a virtual volume fails to respond to an I/O operation, the controller updates metadata 410 to indicate that a virtual volume(s) is in a failed state as in aspect 401.

By way of another example, aspect 402 shows metadata 410 at a second time after controller 112 performs volume recovery operations to restore communication with a failed virtual volume. More specifically, after a virtual volume fails, controller 112 performs volume recovery operations including sending I/O commands to the virtual volume and monitoring for responses to the I/O commands. Upon receiving a response, controller 112 tests the virtual volume by sending additional I/O commands to specific locations of the virtual volume. Based on receiving responses for all of the additional I/O commands, controller 112 updates metadata 410 to indicate that the virtual volume is active. Then, controller 112, among other controllers, can proceed to perform I/O operations at the virtual volume.

Figure 5A:
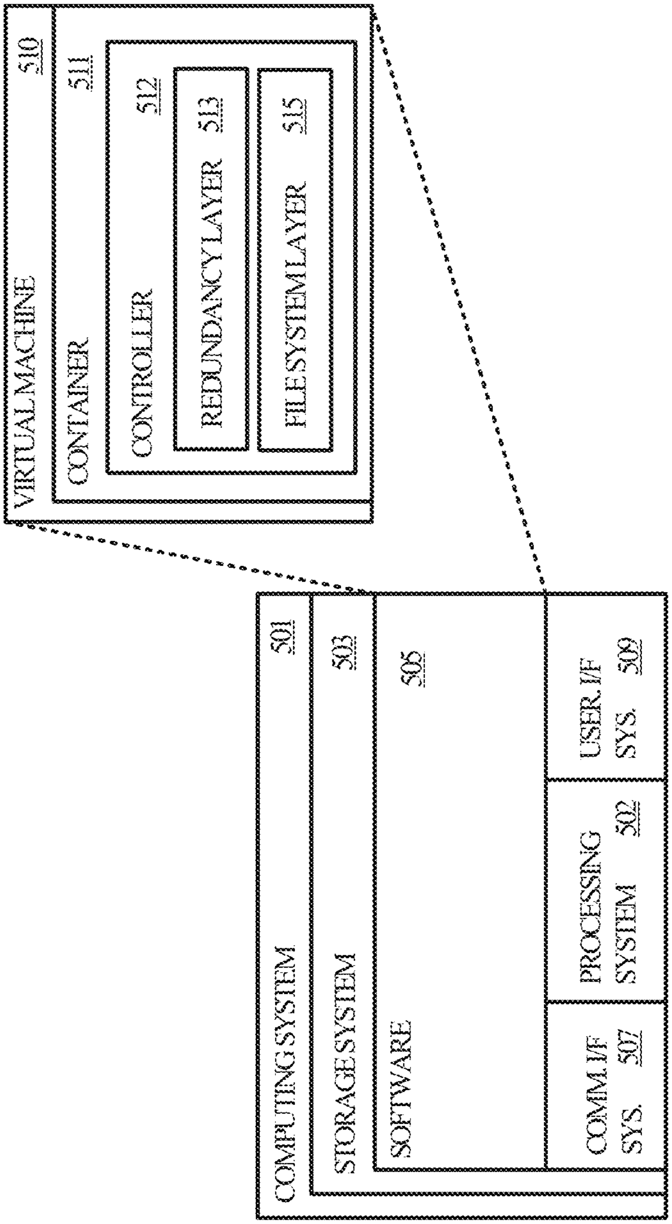
FIG. 5A illustrates a computing system suitable for implementing the various systems, operational environments, architectures, environments, methods, processes, scenarios, sequences, and frameworks discussed below with respect to the other Figures.

FIG. 5A illustrates computing system 501, which is representative of any system or collection of systems in which the various applications, processes, services, and scenarios disclosed herein may be implemented. Examples of computing system 501 include, but are not limited to server computers, web servers, cloud computing platforms, and data center equipment, as well as any other type of physical or virtual server machine, container, and any variation or combination thereof.

Computing system 501 includes processing system 502, storage system 503, software 505, communication interface system 507, and user interface system 509. Software 505 may be implemented by virtual machine 510, which may include container 511 and controller 512. Controller 512 includes redundancy layer 513 and file system layer 515. The following discussion relates to controller 512 and its layers. A discussion of the other elements of FIG. 5A follows the discussion of FIG. 6 below.

In various examples, controller 512 is representative of a containerized control device or system operating on virtual machine 510, and that includes one or more processing devices capable of controlling, managing, and accessing storage of a block storage service (e.g., virtual volumes of block storage service 120). Examples of the processing devices may include one or more central processing units (CPUs), graphical processing units (GPUs), general purpose processors, Application Specific Integrated Circuits (ASICs), microcontroller units (MCUs), digital signal processors (DSPs), field-programmable gate arrays (FPGAs), and the like. In some examples, controller 512 may represent two or more controllers coupled as high availability (HA) pairs for at least fault tolerance and back-up purposes.

Controller 512 may be configured to run an instance of a storage operating system to perform I/O operations at the block storage service. Controller 512 interfaces with the block storage service in accordance with a storage network and access protocol, such as Non-Volatile Memory Express (NVMe). Other protocols such as Network File System (NFS), Server Message Block protocol (SMB), Internet Small Computer System Interface (iSCSI), Fiber Channel (FC), Fiber Channel over Ethernet (FCoE), and the like may be contemplated. As shown in FIG. 5A, controller 512 includes redundancy layer 513, management layer 514, and file system layer 515 collectively capable of performing data storage, data storage management, and data recovery processes, such as those of method 200 of FIG. 2, among other functions, and such as those of operational scenario 600 of FIG. 6 below.

File system layer 515 is representative of a software layer of controller 512 capable of receiving I/O requests from users (e.g., via application 101) and providing data and/or acknowledgements to the users in response to completing an I/O request. File system layer 515 communicates with redundancy layer 513 to provide the I/O requests to redundancy layer 513 and receive data from redundancy layer 513. File system layer 515 may also communicate with other layers (e.g., a management layer) to receive information related to user permissions, security, and the like, with which to use when communicating with users.

Redundancy layer 513 is representative of a software layer of controller 512 that interfaces with file system layer 515 and the block storage service (e.g., block storage service 120). Redundancy layer 513 communicates with file system layer 515 to receive the I/O requests and performs I/O operations at the block storage service. The particular virtual volumes of the block storage service at which redundancy layer 513 performs the I/O operations are based on the I/O requests and based on metadata maintained by redundancy layer 513. The metadata may include logical representations of the virtual volumes, logical addresses corresponding to available storage of the virtual volumes, a layout of the virtual volumes and associated data stored thereon. Additionally, redundancy layer 513 may compute parity data corresponding to stored data for data redundancy and recovery purposes, such as when a subset of the virtual volumes are used in a redundant storage arrangement (e.g., Redundant Array of Inexpensive Disks (RAID)).

In operation, if an I/O operation corresponding to a particular virtual volume (e.g., virtual volume 122) times out and fails (i.e., block storage service 120 fails to provide data and/or an acknowledgement to redundancy layer 513 within a threshold duration), redundancy layer 513 transitions the particular virtual volume(s) to an unresponsive state based on updating the metadata associated with the virtual volume to indicate the unresponsive state of the virtual volume. While the metadata indicates that a virtual volume is unresponsive, controller 512, among other controllers in a file system service, might not perform any I/O operations at the unresponsive virtual volume.

Redundancy layer 513 also performs recovery operations to un-fail a virtual volume from the perspective of the storage operating system. For example, redundancy layer 513 identifies the failed I/O operation, identifies associated virtual volume(s), and attempts to recover the virtual volume(s) based on performing I/O operations at the virtual volume(s) to detect a response. In various examples, this may entail performing (e.g., every X amount of seconds, minutes, or hours (e.g., every five second), where X is a predetermined amount of time) read operations in a repetitive manner to the block storage service. For each read operation, redundancy layer 513 monitors for a response from the virtual volume(s).

Upon detecting a response, redundancy layer 513 initiates a testing operation during which redundancy layer 513 tests the virtual volume(s) with respect to I/O capabilities. To test a virtual volume, redundancy layer 513 may identify several segments (e.g., 16 segments) of the virtual volume based on the metadata associated with the virtual volume, send a test I/O operation to each of the segments, and obtain responses from the segments. A successful test includes one where redundancy layer 513 receives responses from the segments. An unsuccessful test includes one where one or more segments fails to output a response to redundancy layer 513. After a successful test, redundancy layer 513 re-introduces the virtual volume into the file system service based on updating the metadata to indicate that the virtual volume has returned to a responsive state. Then, I/O operations corresponding to the virtual volume may continue.

Figure 5B:
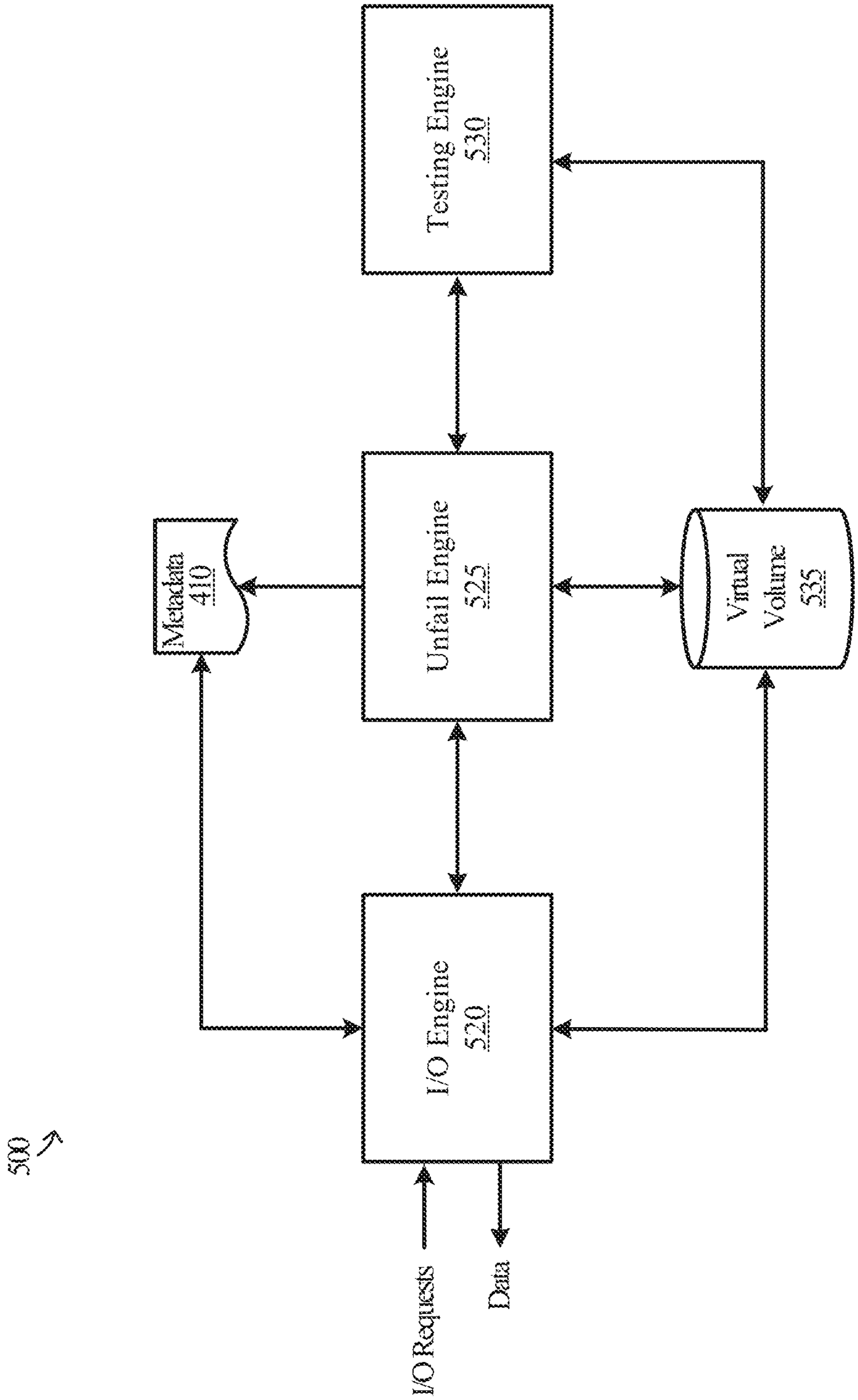
FIG. 5B illustrates an example block diagram of a storage controller used to recover failed virtual storage volumes of a block storage service in an implementation.

FIG. 5B illustrates an example operating environment in which elements of controller 512 operate with elements of a file system service in accordance with an embodiment. FIG. 5B includes operating environment 500, which includes I/O engine 520, unfail engine 525, testing engine 530, metadata 410, and virtual volume 535.

In various examples, I/O engine 520, unfail engine 525, and testing engine 530 are representative of software elements of controller 512 configured to perform I/O operations relative to virtual volume 535 (e.g., a virtual storage volume of a block storage service, e.g., block storage service 120), as well as to perform recovery, testing, and re-integration operations with respect to virtual volume 535. For example, such elements may be configured to perform method 200 of FIG. 2 above.

More specifically, I/O engine 520 may be capable of receiving I/O requests (e.g., from a host, e.g., application 101) and accessing virtual volume 535 in performing I/O operations based on the I/O requests. For example, I/O engine 520 can write data to virtual volume 535 and can read data from virtual volume 535 based on the I/O requests. I/O engine 520 can then provide data downstream following a read request. While performing I/O requests, I/O engine 520 may be capable of identifying a failure in virtual volume 535 causing a timeout in response to an I/O operation. In other words, I/O engine 520 determines that virtual volume 535 fails to respond to an I/O operation within a threshold time, and upon determining the failure of virtual volume 535, I/O engine 520 provides an indication of the failure to unfail engine 525 and updates metadata 410.

Unfail engine 525 may be capable of performing responsiveness or reachability checks with respect to virtual volume 535 (or any other failed virtual volume) to determine whether virtual volume 535 has transitioned from the failed state to an available state. In particular, unfail engine 525 performs one or more I/O operations at virtual volume 535 and monitors for responses to the one or more I/O operations. Once unfail engine 525 receives a response to one of the I/O operations, unfail engine 525 provides an indication of responsiveness to testing engine 530.

Testing engine 530 may be capable of performing I/O capability testing with respect to virtual volume 535 (or any other failed virtual volume) to determine whether all portions (e.g., logical block partitions) of virtual volume 535 have transitioned to the available state and are capable of being accessed by controller 512. In various examples, testing engine 530 identifies multiple portions (also referred to as segments) of virtual volume 535 and performs test I/O operations at each of the multiple portions. If testing engine 530 fails to receive a response from all of the portions, testing engine 530 may provide an indication of a test failure to unfail engine 525. If testing engine 530 receives responses from all of the portions, testing engine 530 provides an indication of a successful test to unfail engine 525. A successful test indicates that virtual volume 535 has recovered from the previous failure and is functional with respect to I/O capabilities.

After receiving the indication of the successful test, unfail engine 525 updates metadata 410 to indicate that virtual volume 535 has transitioned from the failed state to the available state. Then, I/O engine 520 may repeat the previously failed I/O operation, as well as any other pending or future I/O operations at virtual volume 535.

Figure 6:
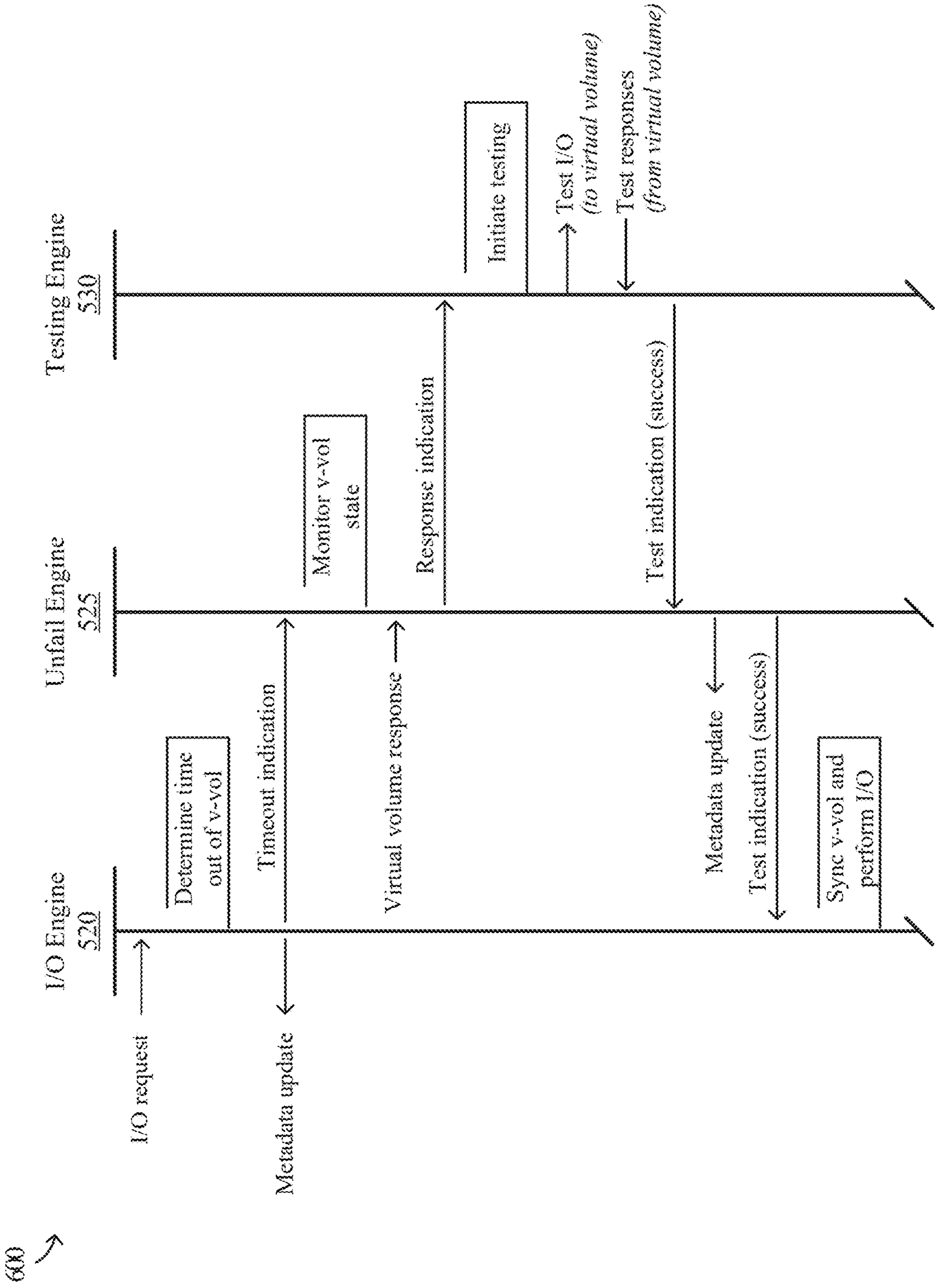
FIG. 6 illustrates an example operational sequence of unfailing a virtual storage volume of a block storage service in an implementation.

FIG. 6 illustrates operational sequence 600 demonstrative of an example sequence of steps performed by elements of a file system service, which includes and references elements of operating environment 500. In particular, operational sequence 600 includes steps performed by input/output (I/O) engine 520, unfail engine 525, and testing engine 530 of controller 512.

To begin operational sequence 600, I/O engine 520 receives an I/O request to read data from virtual volume 535. I/O engine 520 performs the read request at virtual volume 535 but does not receive a response from virtual volume 535 within a threshold amount of time. As such, I/O engine 520 determines a failure at virtual volume 535 and provides an indication of a timeout to unfail engine 525. I/O engine 520 also updates metadata 410 to indicate that virtual volume 535 has transitioned to an unresponsive, or failed, state.

Next, unfail engine 525 performs responsiveness or reachability checks with respect to virtual volume 535 to determine whether virtual volume 535 has transitioned to an available state. In particular, unfail engine 525 performs one or more I/O operations at virtual volume 535 and monitors for responses to the one or more I/O operations. Once unfail engine 525 receives a response to one of the I/O operations, unfail engine 525 provides an indication of responsiveness to testing engine 530.

Responsive to virtual volume 535 being reachable, testing engine 530 initiates I/O capability testing with respect to virtual volume 535 to determine whether all portions (e.g., logical block partitions) of virtual volume 535 have transitioned to the available state and are capable of being accessed by controller 512. In various examples, testing engine 530 identifies multiple portions (also referred to as segments) of virtual volume 535 and performs test I/O operations at each of the multiple portions. If testing engine 530 fails to receive a response from all of the portions, testing engine 530 may provide an indication of a test failure to unfail engine 525. If testing engine 530 receives responses from all of the portions, testing engine 530 provides an indication of a successful test to unfail engine 525. A successful test indicates that virtual volume 535 has recovered from the previous failure and is functional with respect to I/O capabilities.

After receiving the indication of the successful test, unfail engine 525 updates metadata 410 to indicate that virtual volume 535 has transitioned from the failed state to the available state. Then, I/O engine 520 may repeat the previously failed I/O operation, as well as any other pending I/O operations at virtual volume 535.

Figure 7A:
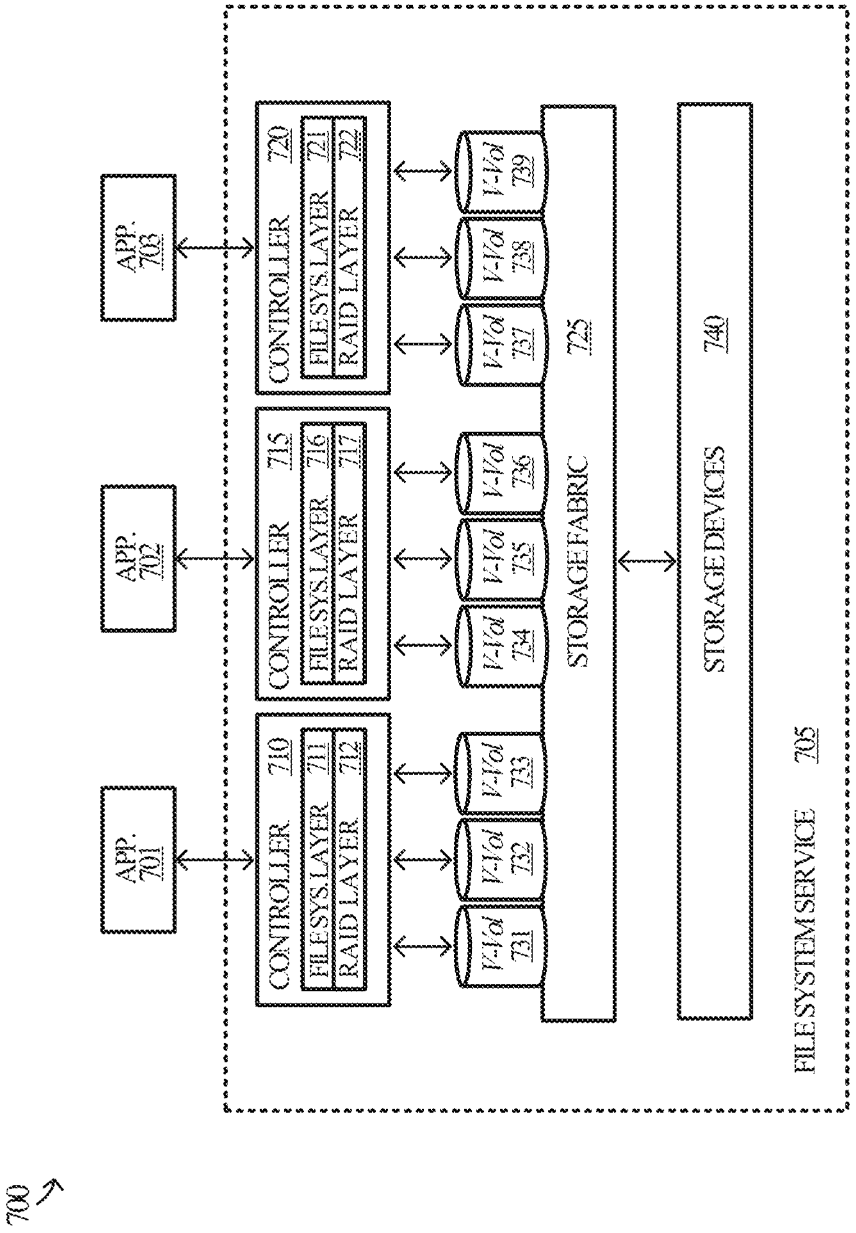
FIG. 7A illustrates an example operating environment in an implementation.

FIG. 7A illustrates operating environment 700 in which elements of a file system service operate in an implementation. Operating environment 700 includes applications 701, 702, and 703 and file system service 705. File system service 705 includes controllers 710, 715, and 720, storage fabric 725, and storage devices 740. In various embodiments, controllers 710, 715, and/or 720 are configured to perform volume recovery and reintegration processes, such as method 200 of FIG. 2.

Operating environment 700 is representative of a data storage environment that includes hardware, software, and firmware components capable of storing data, managing access to the data, and managing storage devices, among other functions. More particularly, in operating environment 700, file system service 705 is representative of a service capable of providing file management, data storage, and storage management for applications 701, 702, and 703, among other applications. For example, file system service 705 is representative of a managed file system service that offers data storage and maintenance managed partially or fully by a service provider. By way of another example, file system service 705 is representative of a file system service that offers such capabilities managed by individual organizations and/or users thereof.

Applications 701, 702, and 703 are representative of applications running on one or more computing devices, systems, servers, or the like. Users of applications 701, 702, and 703 request data storage and/or access to stored data through a file system (e.g., one of controllers 710, 715, and 720) over a communication network. Each of applications 701, 702, and 703 may include and may be implemented in hardware, software, and/or firmware, as well as combinations and variations thereof. By way of example, application 701 is representative of a server running an application that interfaces with controller 710 via a communication network to read from and write to storage provided by and accessible by controller 710 within file system service 705.

Controllers 710, 715, and 720 are representative of devices, systems, servers, or services capable of accessing and managing storage of file system service 705. By way of example, one or more of controllers 710, 715, and 720 may be a server configured to run an instance of a storage operating system (e.g., NetApp ONTAP® (without derogation of trademark rights of NetApp Inc., the assignee of this application)) to perform I/O operations based on I/O requests received from a respective application. Other file management services and applications may also be contemplated for one or more other controllers of file system service 705.

Controllers 710, 715, and 720 interface with applications 701, 702, and 703, respectively, in accordance with a storage network and access protocol, such as Non-Volatile Memory Express (NVMe). The controllers also interface with storage devices 740 via storage fabric 725 in accordance with such storage network and access protocols. For example, storage fabric 725 may be representative of an NVMe fabric (e.g., NVMe over fiber (NVMe-oF) implemented using one or more storage controllers. In some embodiments, storage fabric 725 utilizes other protocols such as Network File System (NFS), Server Message Block protocol (SMB), Internet Small Computer System Interface (iSCSI), Fiber Channel (FC), Fiber Channel over Ethernet (FCoE), and the like.

As shown in operating environment 700, controller 710 includes a file system layer 711 and a RAID layer 712 (e.g., a redundancy layer, where RAID stands for Redundant Array of Inexpensive Disks), controller 715 includes a file system layer 716 and a RAID layer 717, and controller 720 includes a file system layer 721 and a RAID layer 722. The layers of each controller may be collectively capable of performing data storage, data storage management, and data recovery processes, such as those of method 200 of FIG. 2, among other functions. In some embodiments, each controller includes additional layers, such as a management layer, an interface layer, and the like.

File system layers 711, 716, and 721 are each representative of a software layer of a respective controller that interfaces with a respective application and RAID layer. By way of example, file system layer 711 communicates with application 701 to receive I/O requests and to provide data and/or acknowledgements to application 701 in response to completing an I/O operation. File system layer 711 communicates with RAID layer 712 to provide the I/O requests to redundancy layer 712 and to receive data from RAID layer 712 upon completion of corresponding I/O operations. File system layer 711 may also communicate with other layers of controller 710 to receive information related to user permissions, security, and the like, with which to use when communicating with application 701.

RAID layers 712, 717, and 722 are each representative of a software layer of a respective controller that interfaces with a respective file system layer and with virtual volumes instantiated by storage devices 740. By way of example, RAID layer 712 communicates with file system layer 711 to receive I/O requests and performs I/O operations based on the requests at virtual volumes 731, 732, and 733 via storage fabric 725. The particular virtual volumes at which RAID layer 712 performs the I/O operations may be based on the I/O requests and metadata maintained by RAID layer 712. The metadata may include logical representations of the virtual volumes, logical addresses corresponding to available storage of the virtual volumes, a layout of the virtual volumes and associated data stored thereon. Additionally, the RAID layers may compute parity data corresponding to stored data for data redundancy and recovery purposes, such as when a subset of the virtual volumes are used in a redundant storage arrangement (e.g., Redundant Array of Inexpensive Disks (RAID)).

Storage fabric 725 is representative of a storage network architecture including various components capable of handling I/O operations, storing managing data (e.g., managing metadata, logical mappings, and storage allocation), translating protocols between controllers and storage, and the like. For example, storage fabric 725 includes numerous virtual volumes, such as virtual volumes 731, 732, 733, 734, 735, 736, 737, 738, and 739, and one or more storage controllers (e.g., NVMe controllers) that each includes one or more processing devices capable of receiving I/O requests from controller 710, 715, and 720, performing I/O operations corresponding to the I/O requests at the virtual volumes, and providing data and/or acknowledgments to controllers 710, 715, and 720 after performing I/O operations. Examples of the processing devices may include one or more central processing units (CPUs), graphical processing units (GPUs), general purpose processors, Application Specific Integrated Circuits (ASICs), microcontroller units (MCUs), digital signal processors (DSPs), field-programmable gate arrays (FPGAs), and the like.

Virtual volumes 731, 732, 733, 734, 735, 736, 737, 738, and 739 are representative of virtual or cloud-based storage blocks accessible by controllers 710, 715, and 720. The aggregate of the virtual volumes is instantiated by and based on physical infrastructure, such as storage devices 740. Storage devices 740 may be representative of storage devices, such as solid-state drives, hard-disk drives, and the like, capable of storing data. In some embodiments, each virtual volume may correspond to a group of storage devices among storage devices 740. Various combinations and variations may be contemplated when associating virtual volumes and physical drives.

Storage devices 740 are powered and available to be virtualized by storage fabric 725 by various hardware components (e.g., power supplies, network connectivity components, interconnects) capable of connecting the storage devices and the virtual instantiations to one or more communication networks. Accordingly, each of the virtual volumes may be connected to a communication network through which I/O operations can be performed at the virtual volumes from the controllers, and through which data can be transferred to the controllers and to other virtual volumes.

In operation, an application (e.g., application 710) provides an I/O request corresponding to a read request of data to a respective controller (e.g., controller 710). The controller identifies the read request and performs the read request at corresponding virtual volumes of storage fabric 725. If the read request to a particular virtual volume (e.g., virtual volume 731) times out and fails (i.e., storage fabric 725 fails to provide data and/or an acknowledgement to controller 710 within a threshold duration), the controller pauses use of the virtual volume and transitions the virtual volume to an unresponsive state based on updating the metadata associated with the virtual volume to indicate the unresponsive state of the virtual volume.

While the metadata indicates that a virtual volume is unresponsive, the controllers might not perform any I/O operations at the unresponsive virtual volume. During this time, a RAID layer of a controller associated with the unresponsive virtual volume (e.g., RAID layer 712) initiates a recovery operation to attempt to un-fail the virtual volume. In particular, the RAID layer identifies the failed I/O operation, identifies associated virtual volume(s), and attempts to recover the virtual volume(s), such as by performing read operations at the virtual volume(s) and monitoring for responses to the read operations. In various examples, this may entail performing a read operation at the virtual volume(s) every X amount of seconds, minutes, or hours (e.g., every five second), where X is a predetermined amount of time. For each read operation, the RAID layer monitors for a response from the virtual volume(s).

Upon detecting a response, the RAID layer initiates a testing operation during which the RAID layer tests the virtual volume(s) with respect to I/O capabilities (i.e., whether the virtual volume can return data in response to a read request and/or return an acknowledgement in response to a write request). To test a virtual volume, the RAID layer identifies several segments (e.g., 16 segments) of the virtual volume based on metadata associated with the virtual volume. Then, the RAID layer performs a test I/O operation (e.g., a sample/test read operation) at each of the segments and attempts to obtain responses from the segments. A successful test includes one where the RAID layer receives responses from the segments. An unsuccessful test includes one where a segment fails to output a response to the RAID layer.

After a successful test, the RAID layer re-introduces the virtual volume into the file system service. More particularly, the RAID layer updates metadata associated with the virtual volume(s) to indicate that the virtual volume(s) has returned to a responsive state. Then, the controllers of file system service 705 may commence I/O operations corresponding to the virtual volume.

Figure 7B:
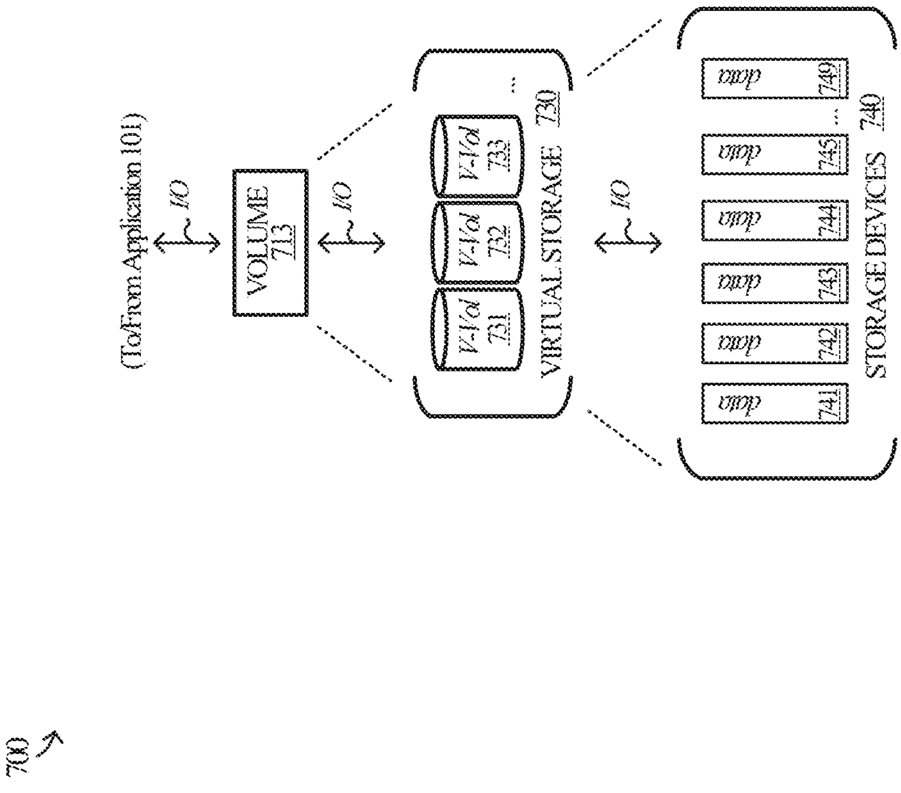
FIG. 7B illustrates an example aspect of storage provided by a file system service in an implementation.

FIG. 7B illustrates an example aspect of storage provided by file system service 705 in an implementation. More specifically, FIG. 7B shows volume 713, virtual storage 730, and storage devices 740 within operating environment 700.

In various embodiments, controllers 710, 715, and 720 each present their own storage to a respective application as if the application were writing data to and reading data from a storage volume associated with a particular controller. By way of example, volume 713 is representative of a storage volume presented to application 701 by controller 710. Each controller may manage data, metadata, and logical mappings of its own volume based on protocols and rules implemented by the file management service run on the controller (e.g., NetApp ONTAP®).

Each storage volume, including volume 713, may be instantiated by one or more virtual volumes provided by storage fabric 725, collectively referred to as virtual storage 730. Accordingly, storage volume 730 includes numerous virtual storage blocks that make up a controller's volume. By way of example, volume 713 provided by controller 710 may be instantiated by virtual volumes 731, 732, and 733 of storage volume 730. Storage fabric 725 may manage data, metadata, and logical mappings of the virtual volumes of storage volume 730 based on the same protocols and rules implemented by the controllers. Alternatively, storage fabric 725 may implement different protocols and rules with which to manage the virtual volumes. In doing so, storage fabric 725 may perform protocol translation operations when performing I/O operations provided by the controllers.

Each virtual volume, including virtual volumes 731, 732, and 733, may be instantiated by one or more physical storage devices (e.g., disks, drives), collectively referred to as storage devices 740. Storage devices 740 includes drives 741, 742, 743, 744, 745, and 749. In various embodiments, each virtual volume of virtual storage 730 corresponds to a subset of the drives of storage devices 740.

Upon a physical failure (e.g., power failure) or a virtual failure (e.g., network failure) of one or more of the drives, a portion of a corresponding virtual volume may also fail and become unavailable for use by a controller unless and until the particular drive(s) is replaced or the issue is resolved. When a virtual volume fails, a portion of the controller's volume also fails, and thus, an I/O operation corresponding to the portion of the volume may timeout. Upon identifying a timeout of an I/O operation, a controller might pause use of the portion of the volume, and consequently, the portion of the virtual volume that instantiates the volume.

By way of example, application 101 requests to read data from volume 713 presented by controller 710. Controller 710 identifies the read request, determines a corresponding virtual volume of virtual storage 730 storing the data, and performs a read operation at virtual volume 731 to obtain the data. However, in this example, virtual volume 731 may be unavailable as drives 741 and 742 (that instantiate virtual volume 731) might be offline. As such, controller 710 does not receive any data from virtual volume 731. Upon determining that virtual volume 731 has failed, controller 710 pauses use of virtual volume 731 and initiates monitoring and recovery processes with respect to virtual volume 731 as described above. Additionally, controller 710 may retrieve the data (e.g., a replicated version of the data) requested by application 701 from a different virtual volume of virtual storage 730 instantiated by a different subset of drives of storage devices 740.

Figure 8:
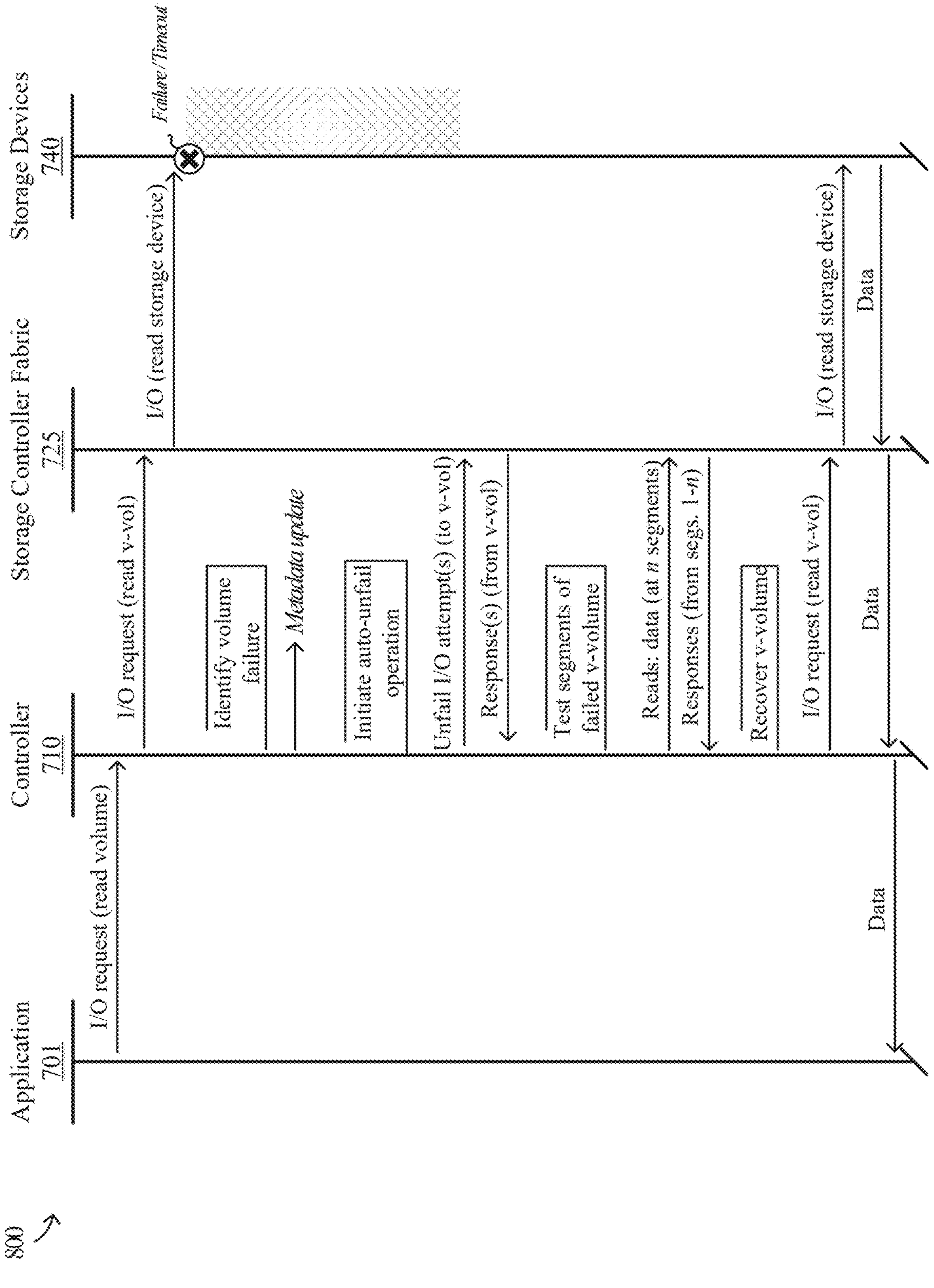
FIG. 8 illustrates an example operational sequence of unfailing a virtual storage volume of a block storage service in an implementation.

FIG. 8 illustrates operational sequence 800 demonstrative of an example sequence of steps performed by elements of a file system service, which includes and references elements of operating environment 700. In particular, operational sequence 800 includes steps performed by controller 710 and storage fabric 725 of file system service 705.

To begin operational sequence 800, controller 710 receives an I/O request from application 701 corresponding to a read request. Controller 710 identifies a virtual volume of storage fabric 725 at which the data associated with the read request is stored, then provides the read request to storage fabric 725. Storage fabric 725 identifies one or more physical drives of storage devices 740 by which the virtual volume is instantiated and at which the data is stored, then storage fabric 725 attempts to read the data from the physical drives.

After attempting to read data from storage devices 740, storage fabric 725 fails to receive data as the physical drives are unresponsive due to a failure (e.g., network failure, power failure). As a result, controller 710 fails to receive data or an acknowledgement from storage fabric 725 within a threshold amount of time and determines that the I/O request has timed out. Upon determining that a virtual volume has failed, controller 710 updates metadata associated with the virtual volume to indicate that the virtual volume has transitioned to an unresponsive state.

Next, controller 710 initiates a volume recovery operation to attempt to reach the virtual volume and obtain a response from the virtual volume while storage fabric 725 attempts to resolve the issue. More specifically, this may entail pausing use of the virtual volume, then attempting to un-fail the virtual volume by performing (every X amount of seconds, minutes, or hours (e.g., every five second) read operations at the virtual volume and monitoring for responses to the read operations.

Meanwhile, storage fabric 725 resolves the issue(s) with storage devices 740 causing the virtual volume to timeout and be unresponsive to I/O operations, and as a result, the virtual volume provides a response to an I/O operation to controller 710.

Once controller 710 receives a response to one of the read operations, controller 710 initiates a testing operation of the virtual volume to test the virtual volume with respect to I/O capabilities (e.g., the ability to provide data in response to a read operation, the ability to write data in response to a write operation) prior to transitioning the virtual volume to a responsive state and commencing any failed or pending I/O operations associated with the virtual volume. In testing the virtual volume, controller 710 first identifies several segments (e.g., 16 segments) of the virtual volume based on metadata associated with the virtual volume. More specifically, controller 710 identifies various portions of the virtual volume, determines start and end addresses associated with the portion, and determines midpoints of the portions. Next, controller 710 performs a test read operation at a midpoint of each portion of the virtual volume in an attempt to determine whether a portion of the virtual volume is responsive or unresponsive with respect to the I/O operation.

Controller 710 monitors for responses to the read operations from the portions of the virtual volume and determines whether the test is successful or unsuccessful based on the number of responses received from the virtual volume. In particular, a successful test includes one where controller 710 receives responses from the portions of the virtual volume. An unsuccessful test includes one where one or more portions fails to output a response to controller 710. If a portion fails to respond to an I/O command, controller 710 determines that the testing operation has failed. If controller 710 receives responses from all the segments, controller 710 recovers the virtual volume. This may entail re-introducing the virtual volume into an available array of virtual volumes, such as by updating the metadata to indicate that the virtual volume has returned to a responsive state and commencing use of the virtual volume.

Controller 710 may then perform the failed I/O operation from the beginning of operational sequence 800, among other I/O operations, to read data from the virtual volume. Alternatively, controller 710 may perform the failed I/O operation despite the unavailability of the virtual volume by reading the data from another virtual volume. Regardless, controller 710 receives the data based on the I/O operation and provides the data downstream to application 701.

It may be appreciated that developing strategies to mitigate the impact of data loss and disruption of requests to access data and corresponding storage devices due to storage device management processes has become important for enterprises and end users. Failures of storage devices, updates or upgrades to storage devices, and/or failures of controllers with which to manage such storage devices may occur and interrupt access to data.

To mitigate the downtime and disruption introduced when recovery failed disks in a data storage environment, and to eliminate manual effort to do so, enterprises may utilize various systems, methods, and devices as described herein. The disclosure describes systems, methods, and devices for managing storage devices, the layout thereof in a data storage environment, the data and metadata stored therein, and managing access to the storage devices, and the like for at least: 1) detecting failed virtual volumes in a block storage service; 2) updating metadata associated with the virtual volumes to indicate an unresponsive state thereof; 3) monitoring for responsiveness of and reachability to the virtual volumes after detecting a failure; 4) performing segment testing of the virtual volumes with respect to input/output capabilities; and 5) automatically re-integrating the virtual volumes into the data storage environment after successful testing and commencing I/O to the re-integrated virtual volumes.

Various embodiments of the present technology provide for a wide range of technical effects, advantages, and/or improvements to computing systems and components. For example, various embodiments may include one or more of the following technical effects, advantages, and/or improvements: 1) management of access to virtual and/or physical storage; 2) automatic recovery of failed virtual storage volumes into a file system service (or a file system thereof); 3) testing of failed virtual storage volumes before recovery thereof; 4) segmented testing of failed virtual storage volumes; and 5) management of metadata corresponding to virtual storage volumes.

Referring again to FIG. 5A, FIG. 5A illustrates computing system 501, which may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 509. Processing system 502 is operatively coupled with storage system 503, communication interface system 507, and user interface system 509.

Processing system 502 loads and executes software 505 from storage system 503. Software 505 includes and implements volume recovery, testing, and reintegration processes, which is representative of the processes discussed with respect to the preceding Figures, and which may be carried out by virtual machine 510, or controller 512 of a container 511 thereof, as discussed in FIG. 5A above. When executed by processing system 502, software 505 directs processing system 502 and virtual machine 510 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may include a microprocessor and other circuitry that retrieves and executes software 505 from storage system 503. Processing system 502 may be implemented within a single processing device but may also be distributed across multiple processing devices or sub-systems that cooperate in executing program instructions. Examples of processing system 502 include general purpose central processing units, microcontroller units, graphical processing units, application specific processors, integrated circuits, application specific integrated circuits, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable, and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. Storage system 503 may be implemented as a single storage device but may also be implemented across multiple storage devices or sub-systems co-located or distributed relative to each other. Storage system 503 may comprise additional elements, such as a controller capable of communicating with processing system 502 or possibly other systems.

Software 505 may be implemented in program instructions and among other functions may, when executed by virtual machine 510, direct virtual machine 510 to operate as described with respect to the various operational scenarios, sequences, and processes illustrated herein. For example, software 505 may include program instructions for implementing data storage management, storage recovery, metadata management, and storage testing processes and procedures as described herein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," "in an implementation," "in some implementations," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 114(f) will begin with the words "means for", but use of the term "for" in any other context is not intended to invoke treatment under 35 U.S.C. § 114(f). Accordingly, the applicant reserves the right to pursue additional claims after filing this application to pursue such additional claim forms, in either this application or in a continuing application.

What is claimed is:

1. A method comprising:
by a storage controller in a file system service:
providing a file system between one or more applications and an array of virtual storage volumes provided by a block storage service to the storage controller;
determining that a virtual storage volume of the array of virtual storage volumes has become unavailable;
in response to determining that the virtual storage volume has become unavailable, pausing use of the virtual storage volume and monitoring for the virtual storage volume to return to an available state;
in response to the virtual storage volume returning to the available state, testing multiple portions of the virtual storage volume; and
in response to successfully testing the multiple portions of the virtual storage volume, commencing with the use of the virtual storage volume.

2. The method of claim 1, wherein determining that the virtual storage volume has become unavailable comprises performing an input/output command at the virtual storage volume and failing to receive a response to the input/output command within a threshold duration.

3. The method of claim 1, further comprising, by the storage controller in the file system service, in response to determining that the virtual storage volume has become unavailable updating metadata associated with the virtual storage volume in the file system to indicate unavailability of the virtual storage volume.

4. The method of claim 3, further comprising, by the storage controller in the file system service, in response to successfully testing the multiple portions of the virtual storage volume, updating the metadata associated with the virtual storage volume in the file system to indicate availability of the virtual storage volume.

5. The method of claim 1, wherein testing the multiple portions of the virtual storage volume comprises performing a set of read operations at segments of the virtual storage volume.

6. The method of claim 5, wherein performing the set of read operations at the segments of the virtual storage volume comprises:
identifying the segments of the virtual storage volume; and
for each of the segments:
determining a midpoint of a segment; and
performing a read operation at the midpoint of the segment.

7. The method of claim 6, wherein successfully testing the multiple portions of the virtual storage volume comprises successfully completing the read operation with respect to each one of the segments.

8. The method of claim 7, wherein the segments correspond to physical storage devices of the block storage service, wherein each of the physical storage devices corresponds to a different one of the segments.

9. A computing apparatus comprising:
one or more computer-readable storage media; and
program instructions stored on the one or more computer-readable storage media executable by a processing device that, based on being read and executed by the processing device, direct the processing device to:
determine that a virtual storage volume of an array of virtual storage volumes provided by a block storage service has become unavailable;
in response to determining that the virtual storage volume has become unavailable, pause use of the virtual storage volume and monitor for the virtual storage volume to return to an available state;
in response to the virtual storage volume returning to the available state, test multiple portions of the virtual storage volume; and
in response to successfully testing the multiple portions of the virtual storage volume, commence with the use of the virtual storage volume.

10. The computing apparatus of claim 9, wherein to determine that the virtual storage volume has become unavailable, the program instructions direct the processing device to perform an input/output command at the virtual storage volume and failing to receive a response to the input/output command within a threshold duration.

11. The computing apparatus of claim 9, wherein the program instructions further direct the processing device to, in response to determining that the virtual storage volume has become unavailable, update metadata associated with the virtual storage volume to indicate unavailability of the virtual storage volume.

12. The computing apparatus of claim 11, wherein the program instructions further direct the processing device to, in response to successfully testing the multiple portions of the virtual storage volume, update the metadata associated with the virtual storage volume in the file system to indicate availability of the virtual storage volume.

13. The computing apparatus of claim 9, wherein to test the multiple portions of the virtual storage volume, the program instructions direct the processing device to perform a set of read operations at segments of the virtual storage volume.

14. The computing apparatus of claim 13, wherein to perform the set of read operations at the segments of the virtual storage volume, the program instructions direct the processing device to:
identify the segments of the virtual storage volume; and
for each of the segments:
determine a midpoint of a segment; and
perform a read operation at the midpoint of the segment.

15. The computing apparatus of claim 14, wherein successfully testing the multiple portions of the virtual storage volume comprises successfully completing the read operation with respect to each one of the segments.

16. The computing apparatus of claim 15, wherein the segments correspond to physical storage devices in the block storage service, and wherein each of the physical storage devices corresponds to a different one of the segments.

17. One or more non-transitory computer-readable storage media having stored thereon program instructions executable by a storage controller in a file system service, that, when executed by one or more processors, direct the storage controller to:
provide a file system between one or more applications and an array of virtual storage volumes provided by a block storage service to the storage controller;

determine that a virtual storage volume of an array of virtual storage volumes provided by the block storage service has become unavailable;

in response to determining that the virtual storage volume has become unavailable, pause use of the virtual storage volume and monitor for the virtual storage volume to return to an available state;

in response to the virtual storage volume returning to the available state, test multiple portions of the virtual storage volume; and in response to successfully testing the multiple portions of the virtual storage volume, commence with the use of the virtual storage volume.

18. The one or more non-transitory computer-readable storage media of claim 17, wherein:

to determine that the virtual storage volume has become unavailable, the program instructions direct the storage controller to perform an input/output command at the virtual storage volume and failing to receive a response to the input/output command within a threshold duration; and in response to determining that the virtual storage volume has become unavailable, the program instructions further direct the storage controller to update metadata associated with the virtual storage volume to indicate unavailability of the virtual storage volume.

19. The one or more non-transitory computer-readable storage media of claim 18, wherein the program instructions further direct the storage controller to, in response to successfully testing the multiple portions of the virtual storage volume, update the metadata associated with the virtual storage volume in the file system to indicate availability of the virtual storage volume.

20. The one or more non-transitory computer-readable storage media of claim 17, wherein:

to test the multiple portions of the virtual storage volume, the program instructions direct the storage controller to perform a set of read operations at segments of the virtual storage volume; and to perform the set of read operations at the segments of the virtual storage volume, the program instructions direct the storage controller to:

identify the segments of the virtual storage volume; and for each of the segments:

determine a midpoint of a segment; and perform a read operation at the midpoint of the segment.

* * * * *